US012662717B2

(12) United States Patent
Qu et al.

(10) Patent No.: US 12,662,717 B2
(45) Date of Patent: Jun. 23, 2026

(54) METHOD FOR RECYCLING SILVER FROM WASTE IC CHIPS USING SOLUBLE STARCH

(71) Applicant: Nanjing University, Nanjing (CN)

(72) Inventors: Zhan Qu, Nanjing (CN); Xianze Wang, Nanjing (CN); Hongqiang Ren, Nanjing (CN); Jinfeng Wang, Nanjing (CN); Junzhen Liu, Nanjing (CN); Yusen Chen, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 413 days.

(21) Appl. No.: 18/210,646

(22) Filed: Jun. 15, 2023

(65) Prior Publication Data

US 2024/0191323 A1 Jun. 13, 2024

(30) Foreign Application Priority Data

Dec. 13, 2022 (CN) .......................... 202211604379.8

(51) Int. Cl.
C22B 11/00 (2006.01)
B22F 9/04 (2006.01)
(Continued)

(52) U.S. Cl.
CPC .............. C22B 11/046 (2013.01); B22F 9/04 (2013.01); B22F 9/24 (2013.01); C01G 3/02 (2013.01);
(Continued)

(58) Field of Classification Search
CPC ......... C22B 11/046; C22B 1/005; C22B 3/22; C22B 3/24; C22B 7/007; B22F 9/04; B22F 9/24; B22F 2301/255; C01G 3/02
See application file for complete search history.

(56) References Cited

U.S. PATENT DOCUMENTS 11,136,681 B2 * 10/2021 Moskovchenko ...... C22B 11/04
2013/0336857 A1 * 12/2013 Korzenski ........... C22B 15/0006
423/1

FOREIGN PATENT DOCUMENTS

CN 103509951 A * 1/2014
CN 106001608 A * 10/2016 ............. B82Y 40/00
(Continued)

OTHER PUBLICATIONS

CN-106001608-A machine translation (Year: 2016).*
CN-103509951-A machine translation (Year: 2014).*
CN-11048478-A machine translation (Year: 2019).*

*Primary Examiner* — Tima M. McGuthry-Banks
(74) *Attorney, Agent, or Firm* — MATTHIAS SCHOLL P.C.; Matthias Scholl

(57) ABSTRACT

A method for recycling silver from a waste IC chip include: heating to disassemble an IC chip, and crushing the IC chip into powders; adding the powders to a nitric acid solution, heating, centrifuging and collecting a first filtrate; adding soluble starch to the first filtrate, where a mass concentration ratio of the soluble starch to Fe in the first filtrate is 5.20-7.30; heating a resulting mixture to 130-175° C. for a first hydrothermal reaction, separating a precipitate from the first hydrothermal reaction and collecting a second filtrate; heating the second filtrate to 160-230° C. for a second hydrothermal reaction, separating a solid from the second hydrothermal reaction and collecting a third filtrate; drying, grinding, and sieving the solid to obtain silver powders; and adding alkali to the third filtrate to form a precipitate of Cu, and separating the precipitate to yield copper hydroxide.

12 Claims, 13 Drawing Sheets

(51) Int. Cl.
| | | |
|---|---|---|
| *B22F 9/24* | (2006.01) | |
| *C01G 3/02* | (2006.01) | |
| *C22B 1/00* | (2006.01) | |
| *C22B 3/22* | (2006.01) | |
| *C22B 3/44* | (2006.01) | |
| *C22B 7/00* | (2006.01) | |

(52) U.S. Cl.
CPC ................ *C22B 1/005* (2013.01); *C22B 3/22* (2013.01); *C22B 3/44* (2013.01); *C22B 7/007* (2013.01); *B22F 2301/255* (2013.01)

(56) References Cited

FOREIGN PATENT DOCUMENTS

| | | | | | |
|---|---|---|---|---|---|
| CN | 11048478 A | * | 11/2019 | | |
| WO | WO-2017037625 A1 | * | 3/2017 | ............. | C22B 34/12 |
| WO | WO-2023087114 A1 | * | 5/2023 | ............... | B09B 3/40 |

* cited by examiner

METHOD FOR RECYCLING SILVER FROM WASTE IC CHIPS USING SOLUBLE STARCH

CROSS-REFERENCE TO RELATED APPLICATIONS

Pursuant to 35 U.S.C. § 119 and the Paris Convention Treaty, this application claims foreign priority to Chinese Patent Application No. 202211604379.8 filed Dec. 13, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the technology in extraction of valuable resources from solid waste, and more particularly, to a method for recycling silver from waste integrated circuit (IC) chips.

Electronic waste is valuable and contains various materials, such as precious metals, heavy metals, non-ferrous metals, and polymer materials. IC chips are an important component of electronic waste and typically include 30% plastic, 30% inert oxides, and 40% valuable metals. The valuable metals mainly include 27% copper, 7% iron, 2% silicon, and precious metals such as gold, silver, palladium, etc. Known silver recycling processes for waste IC chips involve: (1) pyrometallurgical process: metallurgical furnaces are used to heat the precious metal to melt with other metal smelting material or salt, and then the metal melting material or salt are refined or electrolyzed to obtain a precious metal product. However, pyrometallurgy has several drawbacks, including incomplete metal separation and high energy consumption; and (2) wet process: strong acid, strong alkali, or strong oxidizing solvents are used to leach valuable metals from the waste IC chips and then transferred to a solution. The wet process has advantages over the pyrometallurgical process, with simple process flow, convenient operation, low waste discharge, wide industrial application, and high economic benefits. However, wet processes also suffer from several problems, including poor adaptability to fluctuation in waste circuit boards, inability to dissolve the waste circuit boards with resin materials, ceramic packaging or solder, low recycling rate of precious metals, and large amounts of acidic and alkaline waste liquid generated during the leaching process; (3) biological treatment process: the physiological metabolism process of microorganisms and the redox function of metabolic products are used to leach metals from electronic waste. Researchers favor biotechnology due to its short process flow and environmental friendliness. However, this technology often relies on microorganisms as test materials, which makes it challenging to promote its industrial application and achieve industrialization due to the relatively strict environmental requirements.

SUMMARY

To solve the aforesaid problems, the disclosure provides a method for the directional stepwise recycling of metals from waste IC chips, using a clean and cost-effective process that not only recycles precious metals (such as silver) but also separates low-value metals.

The method comprises:

1) pre-treatment of chips: heating to disassemble an IC chip, and crushing the IC chip into powders;

2) metal leaching: adding the powders to a nitric acid solution, heating, centrifuging and collecting a first filtrate; where, the operation transferring target components from a solid phase to a liquid phase is conducive to the recycling of heavy metal;

3) selective separation of Fe: adding soluble starch to the first filtrate obtained in 2), where a mass concentration ratio of the soluble starch to Fe in the first filtrate is 5.20-7.30; heating a resulting mixture to 130-175° C. for a first hydrothermal reaction, separating a precipitate (a by-product of hematite) from the first hydrothermal reaction and collecting a second filtrate; the process involves the following reaction:

$$2Fe^{3+} + 3H_2O = Fe_2O_3\downarrow + 6H^+;$$

$$5(C_6H_{10}O_5)_n + 24nNO_3^- + 24nH^+ = 30nCO_2\uparrow + 12nN_2\uparrow + 37nH_2O;$$

4) selective recycling of Ag: heating the second filtrate to 160-230° ° C. for a second hydrothermal reaction, separating a solid from the second hydrothermal reaction and collecting a third filtrate; drying, grinding, and sieving the solid to obtain silver powders; the process involves the following reaction:

$$4Ag^+ + 2H_2O = 4Ag\downarrow + O_2\uparrow + 4H^+;$$

$$5(C_6H_{10}O_5)_n + 24nNO_3^- + 24nH^+ = 30nCO_2\uparrow + 12nN_2\uparrow + 37nH_2O;$$

5) recycling of Cu: adding alkali to the third filtrate obtained in 4) to form a precipitate of Cu, and separating the precipitate of Cu from the third filtrate to recycle Cu:

$$Cu^{2+} + OH^- = Cu(OH)_2\downarrow.$$

In a class of this embodiment, the second hydrothermal reaction in 4) is conducted at a higher temperature than the first hydrothermal reaction in 3), with a temperature difference of at least 20° C.

In a class of this embodiment, the mass concentration ratio of the soluble starch to Fe in the first filtrate is 6.0-7.0.

In a class of this embodiment, in 3), the first hydrothermal reaction is performed for 320-400 min, and more preferably 355-365 min; the reaction time controls the $H^+$ concentration, thereby regulating the hydrolysis of metal ions to ensure that only iron ions precipitate while other ions remain in solution.

In a class of this embodiment, in 3), before conducting the first hydrothermal reaction, the pH of the first filtrate is adjusted to 0.3±0.02.

In a class of this embodiment, in 3), the first hydrothermal reaction is performed at 140-160° C.

In a class of this embodiment, in 4), the second hydrothermal reaction is performed at 160-190° C.

In a class of this embodiment, in 4), the second hydrothermal reaction is performed for 560-640 min, and more preferably 595-605 min.

In a class of this embodiment, in 4), the resulting solid is dried at 60-100° C.

In a class of this embodiment, in 2), to improve the leaching rate and leaching speed of the metal, the heating temperature is 50-90° C., and more preferably 65-75° C.

In a class of this embodiment, in 5), the alkali is added to adjust the pH of the first filtrate to 8.2±0.05.

In a class of this embodiment, the method comprises:

1) pre-treatment of an IC chip: heating an adhesive that connects a heat sink and a waste IC chip with a heat gun at 200-240° C. for 30 seconds, and detaching the heat sink from the waste IC chip; crushing the detached IC chip into coarse particles of a diameter of 2.5-1 cm using a coarse crusher; and further crushing the coarse particles into the powders of a diameter of 0.3 cm using a fine crusher;

2) metal leaching from an IC chip: pouring the powders obtained in 1) into a glass beaker; adding 3 mol/L nitric acid solution to the powders in a solid-liquid ratio of 1:3; heating and stirring a mixture in the glass beaker at 50-90° C. with a stirring rate of 300 r/min for 1-2 h; centrifuging the mixture and passing the mixture through a filter, so that a filter residue is separated from the first filtrate; the first filtrate comprising silver and other metals, and the filter residue comprising alloy;

3) selective separation of Fe: measuring the pH of the first filtrate obtained in 2); adding nitric acid to adjust the pH of the first filtrate to 0.3±0.02 thus yielding a mixed solution; measuring a content of Fe in the mixed solution; pouring the mixed solution into a first reaction kettle and adding the soluble starch to the mixed solution, where the mass concentration ratio of soluble starch to Fe in the solution is 5.20-7.30; stirring the mixed mixture; covering the first reaction kettle and heating the first reaction kettle to 130-175° C. for 300 min to carry out the first hydrothermal reaction, to yield a brick-red precipitate at a bottom of the first reaction kettle; centrifuging a resulting product in the reaction kettle, so that the brick-red precipitate is separated from the second filtrate; collecting the second filtrate; and drying the brick-red precipitate at 75° C. for 20 h, where the brick-red precipitate is a byproduct of hematite;

4) selective recycling of Ag: transferring the second filtrate obtained in 3) into a second reaction kettle; sealing the second reaction kettle at 160-230° C. for 600 min for the second hydrothermal reaction; after the second hydrothermal reaction, cooling a resulting product in the second reaction kettle to room temperature and centrifuging the resulting product to yield a precipitate and the third filtrate; collecting and drying the precipitate at 60-100° C., then grinding and sieving the dried precipitate to obtain silver powders; and 5) recycling of Cu: adding 7 mol/L NaOH to adjust the pH of the third filtrate to 8.2±0.05; resting a mixture of the third filtrate and NaOH at 30° ° C. for 5 h; centrifuging the mixture for solid-liquid phase separation; collecting a solid phase; and drying the solid phase at 80° C. overnight.

The following advantages are associated with the method of the disclosure:

(1) The disclosure provides a method for recycling silver from waste IC chips using soluble starch. The method requires only a small amount of low-cost reagents and effectively recycles high-value precious metal along with other low-value impurities present in IC chips, resulting in a more resource-efficient and simplified process when compared to the conventional pyrometallurgical recycling process. The method is easy to operate and highly efficient, requiring only a single vessel without any other equipment or instruments. Moreover, the disclosure selectively separates and precipitates about 99.8% of Fe in the solution, leading to a higher silver recycling rate with up to 98% purity. The recycled products can be used as industrial raw materials with significant value.

(2) The disclosure provides a strategy for recycling metal ions from waste IC chips, which includes pre-treatment, metal leaching, iron precipitation, and silver and copper recycling. Excess soluble starch is used in the iron precipitation process to further increase the recycling rate of silver metal.

(3) Nitric acid is used in the leaching process, which is more effective than hydrochloric acid and sulfuric acid.

(4) By controlling the temperature and duration of heating in the iron precipitation process, the recycling rate of silver metal is improved.

(5) The entire process of the disclosure does not produce any waste liquid or harmful gases, making it more energy-efficient and eco-friendly compared to other methods of IC chip treatment. The disclosure method promotes the recycling of metal resources and contributes to the development of electronic waste treatment in a green, low-carbon, and sustainable direction.

DETAILED DESCRIPTION

Figure 1:
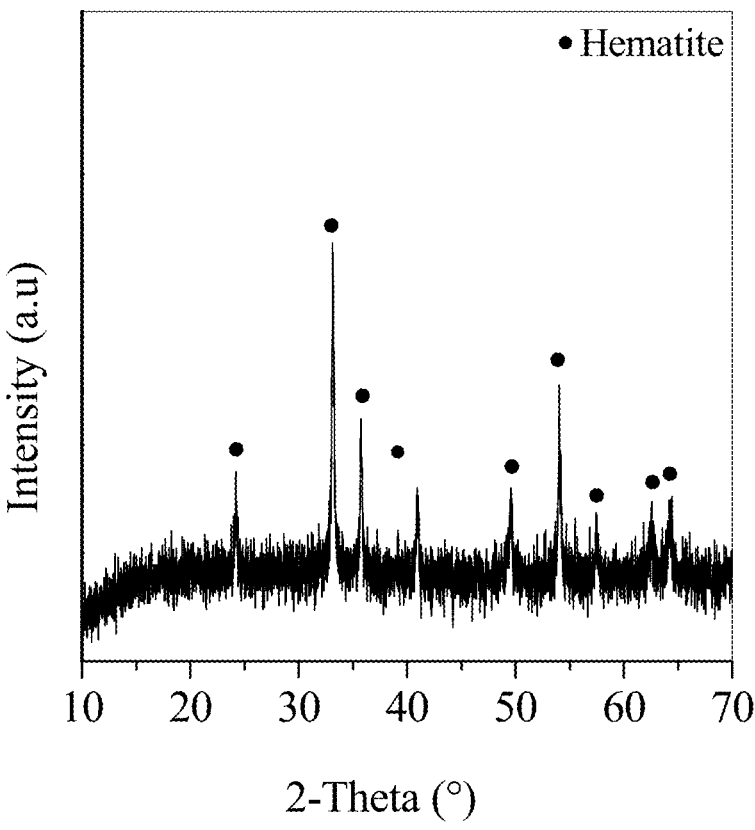
FIG. 1 is an X-ray diffraction (XRD) spectrum of the hematite recycled in 3) of Example 1.
Figure 2:
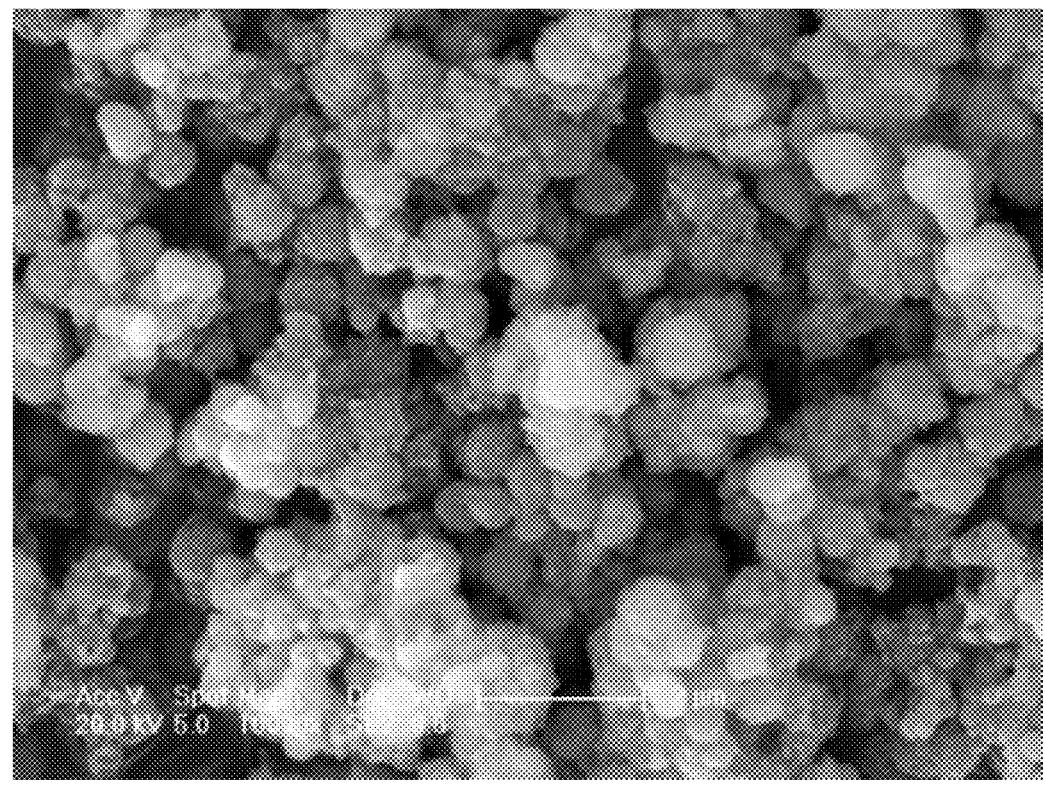
FIG. 2 is a SEM spectrum of the crystal structure of the hematite recycled in 3) of Example 1.
Figure 3:
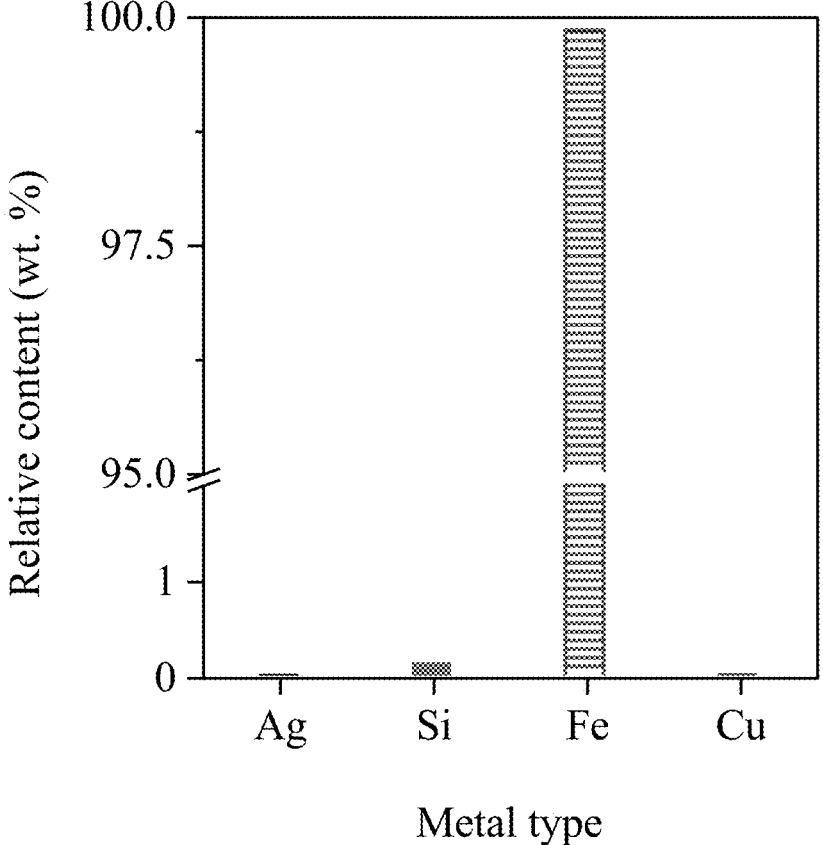
FIG. 3 is an X-ray fluorescence (XRF) spectrum of the composition of the hematite recycled in 3) of Example 1.
Figure 4:
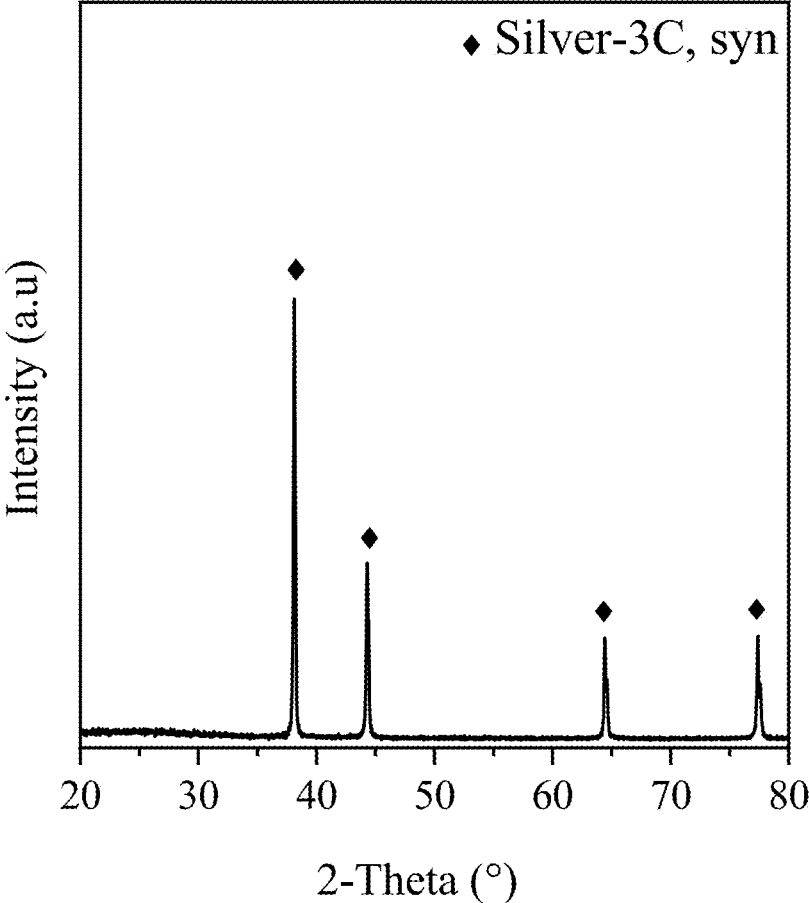
FIG. 4 is an XRD spectrum of the crystal structure of the silver recycled in 4) of Example 1.
Figure 5:
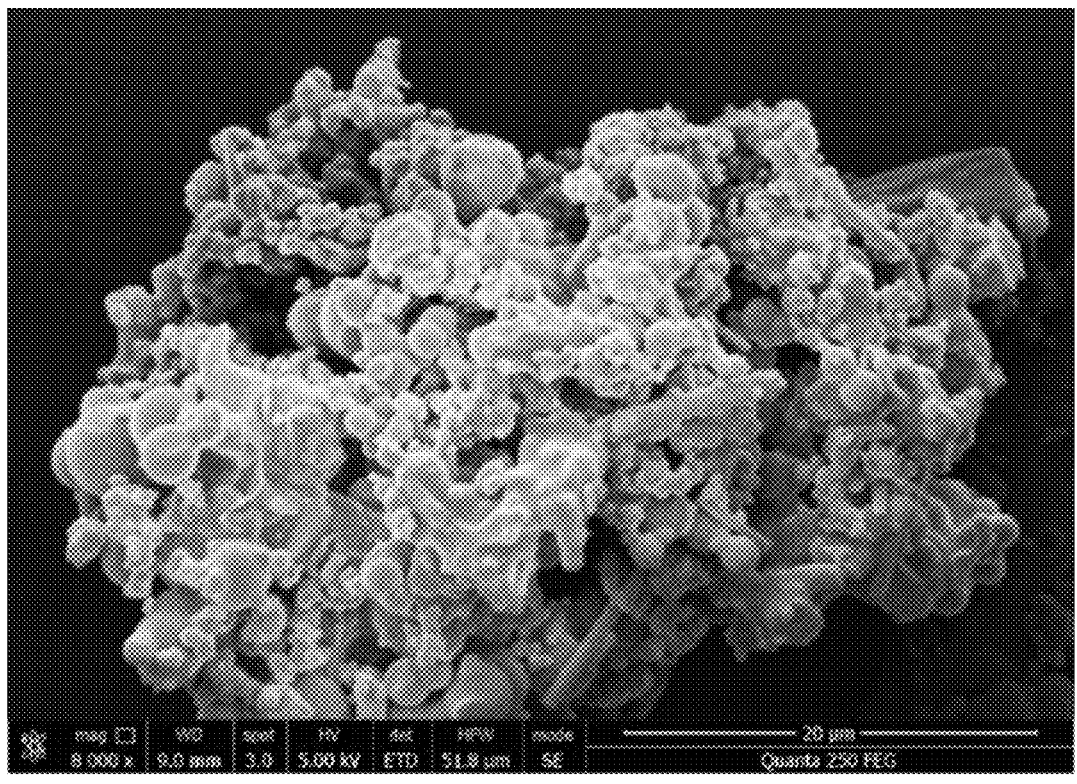
FIG. 5 is a SEM spectrum of the morphology of the silver recycled in 4) of Example 1.
Figure 6:
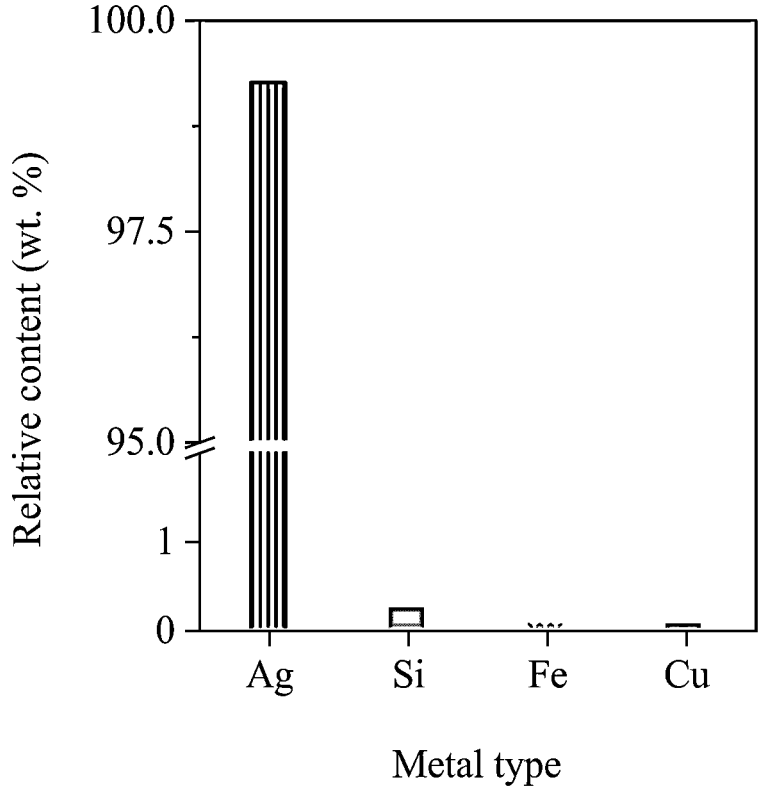
FIG. 6 is an XRF spectrum of the composition of the silver recycled in 4) of Example 1.
Figure 7:
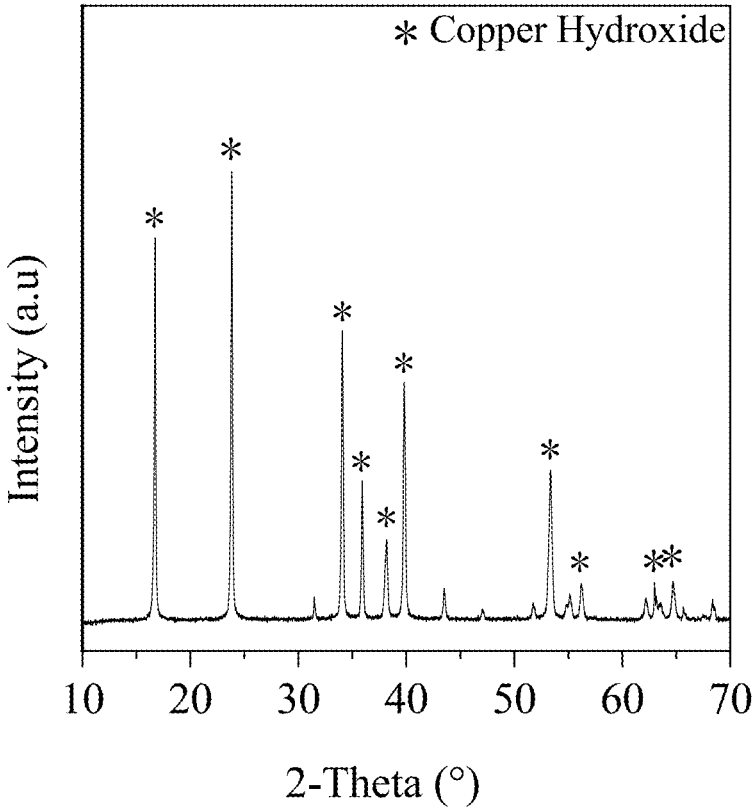
FIG. 7 is an XRD spectrum of the crystal structure of the cupric hydroxide recycled in 5) of Example 1.
Figure 8:
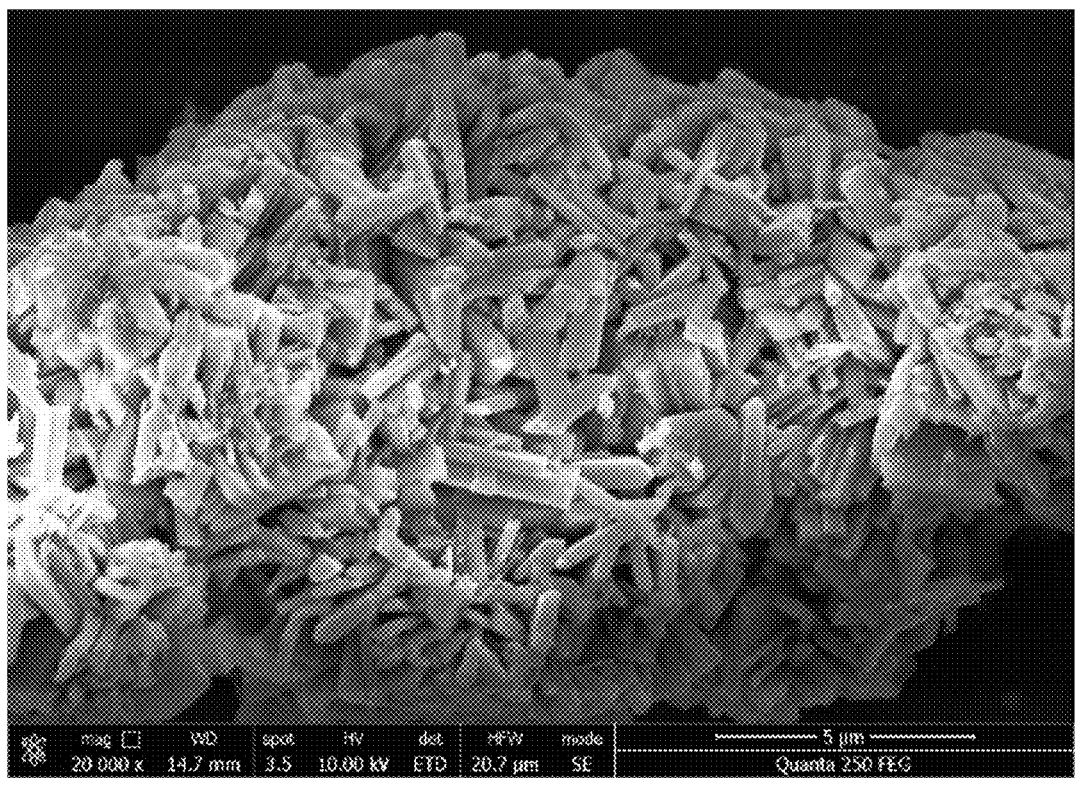
FIG. 8 is a SEM spectrum of the morphology of the cupric hydroxide recycled in 5) of Example 1.
Figure 9:
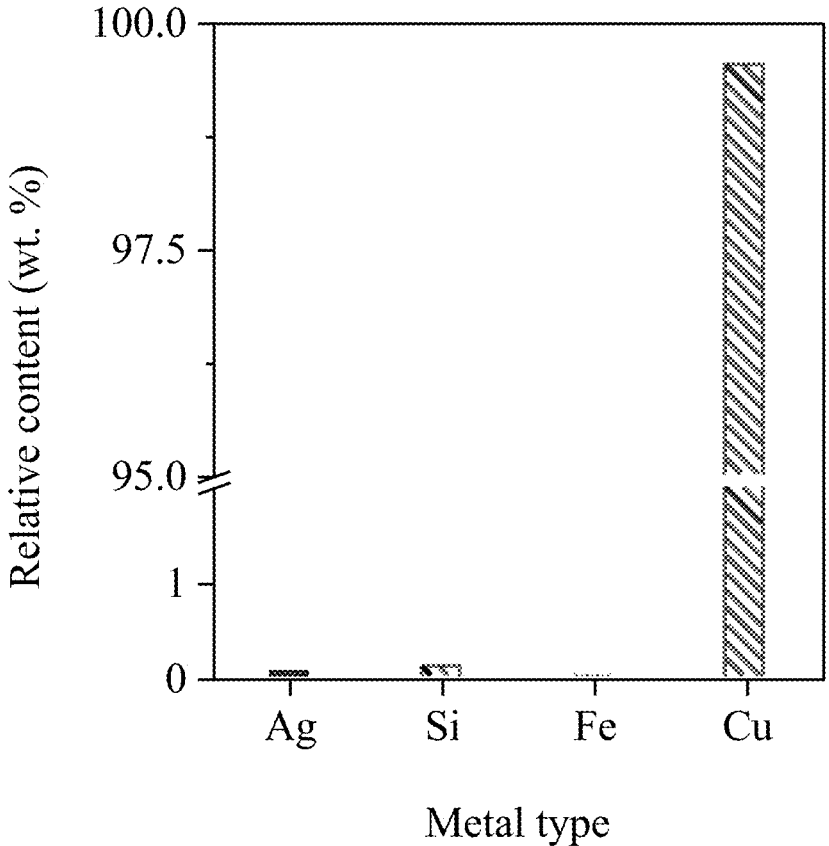
FIG. 9 is an XRF spectrum of the composition of the cupric hydroxide recycled in 5) of Example 1.

The disclosure is further described below through specific examples. Unless otherwise defined, all technical and scientific terms used in the disclosure have the same meaning as they are understood by those skilled in the art of the present invention. If no specific conditions are stated in the examples, they are carried out under either conventional conditions or conditions recommended by the manufacturer. Reagents or instruments not specified by the manufacturer are considered conventional products that can be obtained through commercial channels.

The term "about" as used in this document is meant to allow for flexibility and imprecision associated with a given term, measurement, or value. Those skilled in the art can easily determine the degree of flexibility for specific variables.

Numerical data such as concentration, amount, and others may be presented in range format in the disclosure. It should be understood that such range format is for convenience and brevity only and should be interpreted flexibly to include not only the explicitly stated range limits but also all individual values and sub-ranges encompassed within the range, as if each value and sub-range were explicitly stated. For example, a numerical range of about 1 to about 4.5 should be interpreted as including not only the explicitly stated limits of 1 to about 4.5, but also individual numbers (such as 2, 3, 4) and sub-ranges (such as 1 to 3, 2 to 4, etc.). The same principle applies to ranges or features described with only one value, such as "less than about 4.5," which should be interpreted as including all the above values and ranges. Furthermore, this interpretation should apply regardless of the breadth of the range or feature described.

The order of steps described in a method or claim is not limited to the order set forth in the claim, and any step can be carried out in any order.

Example 1

A method for recycling metal ions from a certain brand of a waste computer chip, and the method comprises:

1) pre-treatment of a computer chip: an adhesive that connects a heat sink to a computer chip was heated with a heat gun at 200-240° C. for 30 seconds, so that the heat sink was detached from the computer chip; the detached computer chip was crushed into coarse particles of a diameter of 0.5-1 cm using a coarse crusher; and further crushed into the powders of a diameter of 0.3 cm using a fine crusher;

2) metal leaching from a computer chip: the powders obtained in 1) was poured into a glass beaker; 3 mol/L nitric acid solution was added to the powders in a solid-liquid ratio of 1:3; the mixture was then heated and stirred at 80° ° C. with a stirring rate of 300 r/min for 2 h; the resulting mixture was centrifuged and passed through a filter, so that the filter residue was separated from the filtrate; and the filtrate contained silver and other metals;

3) selective separation of Fe: the pH of the first filtrate obtained in 2) was measured; nitric acid was added to adjust the pH of the filtrate to 0.3±0.02; the content of Fe in the solution was measured; the solution was poured into a reaction kettle, and soluble starch was added to the solution; the mass concentration ratio of soluble starch to Fe in the solution was 6.5; the resulting mixture was stirred evenly; the reaction kettle was covered and heated to 150° C. for 300 min to carry out a hydrothermal reaction; after the hydrothermal reaction was completed, a brick-red precipitate appeared at the bottom of the reaction kettle; the resulting product was centrifuged, so that the brick-red precipitate was separated from the liquid; the liquid was collected; and the brick-red precipitate was dried at 80° ° C. for 20 h; the brick-red precipitate, which was a byproduct of hematite, contained 98.5% iron oxide;

4) selective recycling of Ag: the second filtrate obtained in 3) was transferred into the reaction kettle; the reaction kettle was then tightly sealed; and the hydrothermal reaction was conducted at 180° C. for 600 min; after the hydrothermal reaction was completed, the resulting product was cooled to room temperature and transferred into a 50 mL centrifuge tube, then centrifuged at 8000 rpm for 8 min and passed through a filter, so that the filter residue was separated from the liquid; the filter residue, which was silver powder, was dried at 80° ° C., ground, and sieved to obtain spherical silver powder with a purity of 98.9%; and 5) recycling of Cu: after removal of Fe, Cu, and Ag from the chip leaching solution, most of Cu remained in the liquid; the liquid obtained in 4) was poured into the reaction kettle; 7 mol/L NaOH was added to adjust the pH of the liquid to 8.2±0.05; the resulting solution was allowed to stand at 30° C. for 5 h and centrifuged, so that a blue precipitate was separated from the liquid; the blue precipitate, which was copper hydroxide precipitate, was collected and dried at 80° C. overnight to achieve a purity of 93.4%.

Example 2

A method for recycling metal ions from a certain brand of a waste mobile chip, and the method comprises:

1) pre-treatment of a mobile chip: an adhesive that connects a heat sink to a mobile chip was heated with a heat gun at 200-240° C. for 30 seconds, so that the heat sink was detached from the mobile chip; the detached mobile chip was crushed into coarse particles of a diameter of 0.5-1 cm using a coarse crusher; and further crushed into the powders of a diameter of 1 mesh using a fine crusher;

2) metal leaching from a mobile chip: the powders obtained in 1) was poured into a glass beaker; 3 mol/L nitric acid solution was added to the powders in a solid-liquid ratio of 1:3; the mixture was then heated and stirred at 90° C. with a stirring rate of 300 r/min for 1 h; the resulting mixture was centrifuged, so that the filter residue was separated from the filtrate; and the filtrate contained silver and other metals;

3) selective separation of Fe: the pH of the first filtrate obtained in 2) was measured; nitric acid was added to adjust the pH of the filtrate to 0.3±0.02; the content of Fe in the solution was measured and found to be 3.2 g/L; the solution was poured into a reaction kettle, and soluble starch was added to the solution; the mass concentration ratio of soluble starch to Fe in the solution was 6.5; the resulting mixture was stirred evenly; the reaction kettle was covered and heated to 150° C. for 300 min to carry out a hydrothermal reaction; after the hydrothermal reaction was completed, a brick-red precipitate appeared at the bottom of the reaction kettle; the resulting product was centrifuged, so that the brick-red precipitate was separated from the liquid; the liquid was collected; and the brick-red precipitate was dried at 80° C. for 20 h; the brick-red precipitate, which was a byproduct of hematite, contained 98.5% iron oxide;

4) selective recycling of Ag: the second filtrate obtained in 3) was transferred into the reaction kettle; the reaction kettle was then tightly sealed; and the hydrothermal reaction was conducted at 160° C. for 650 min; after the hydrothermal reaction was completed, the resulting product was cooled to room temperature and transferred into a 50 mL centrifuge tube, then centrifuged at 8000 rpm for 12 min, so that the filter residue was separated from the liquid; the filter residue, which was silver powder, was dried at 100° C., ground, and sieved to obtain spherical silver powder with a purity of 99.9%; and

5) recycling of Cu: after removal of Fe, Cu, and Ag from the chip leaching solution, most of Cu remained in the liquid; the liquid obtained in 4) was transferred into the reaction kettle; 7 mol/L NaOH was added to adjust the pH of the liquid to 8.2±0.05; the resulting solution was allowed to stand at 30° ° C. for 5 h and centrifuged, so that a blue precipitate was separated from the liquid; the blue precipitate, which was copper hydroxide precipitate, was collected and dried at 80° C. overnight to achieve a purity of 95.0%.

Example 3

A third example is similar to Example 1, with the following differences:

In 3), the mass concentration ratio of soluble starch to Fe in the solution was varied to 3, 6.5, and 9.

Figure 10:
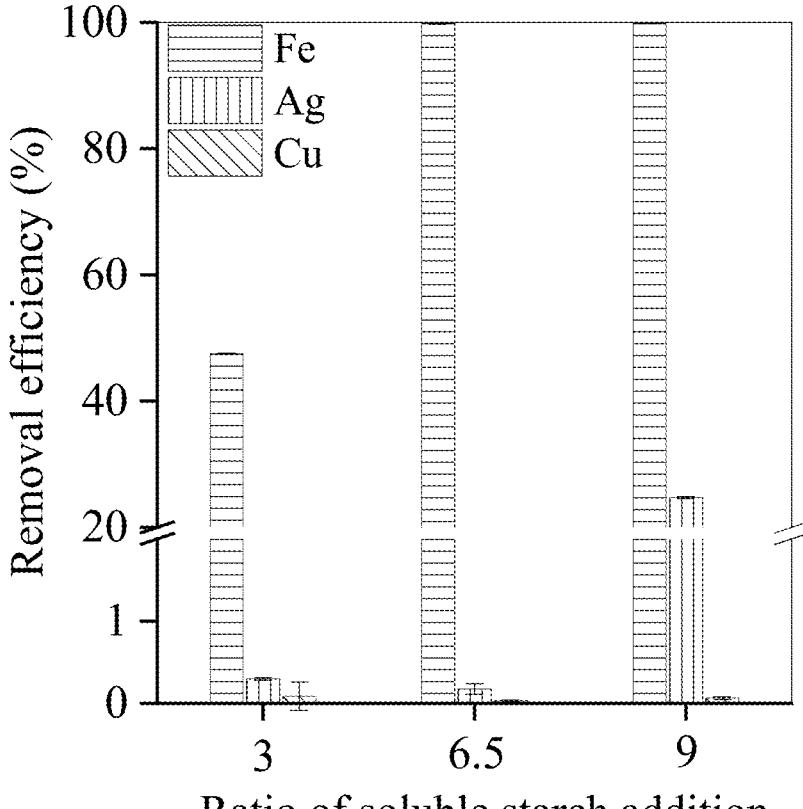
FIG. 10 shows the removal of metals at different mass concentration ratios of soluble starch to Fe in 3) of Example 3.
Figure 11:
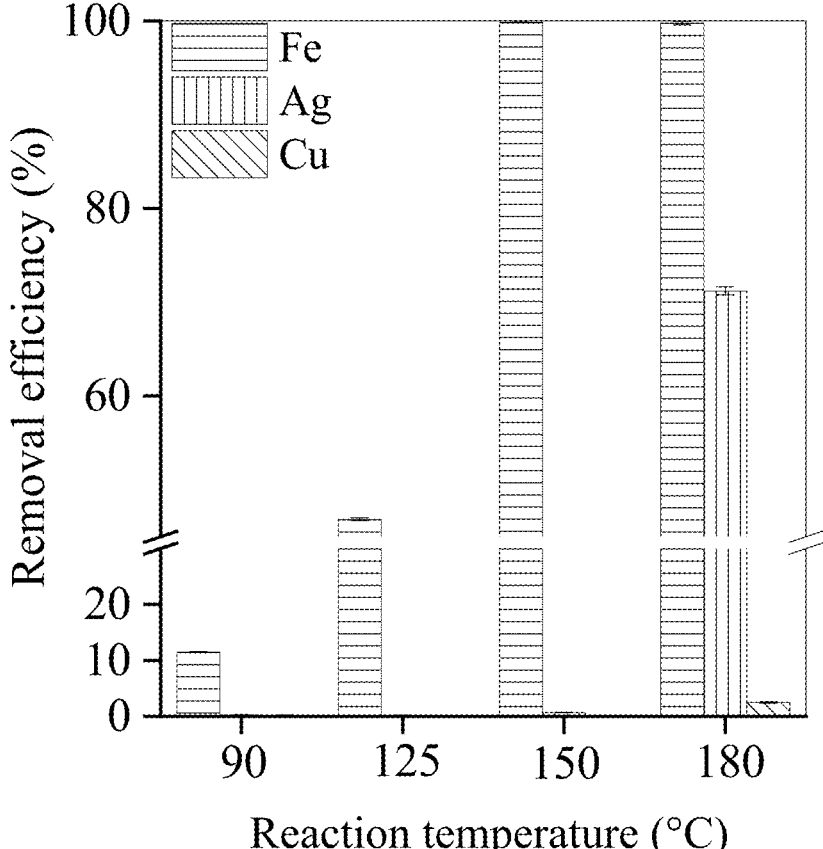
FIG. 11 shows the effect of different hydrothermal reaction temperatures on removal of metals in 3) of Example 4.
Figure 12:
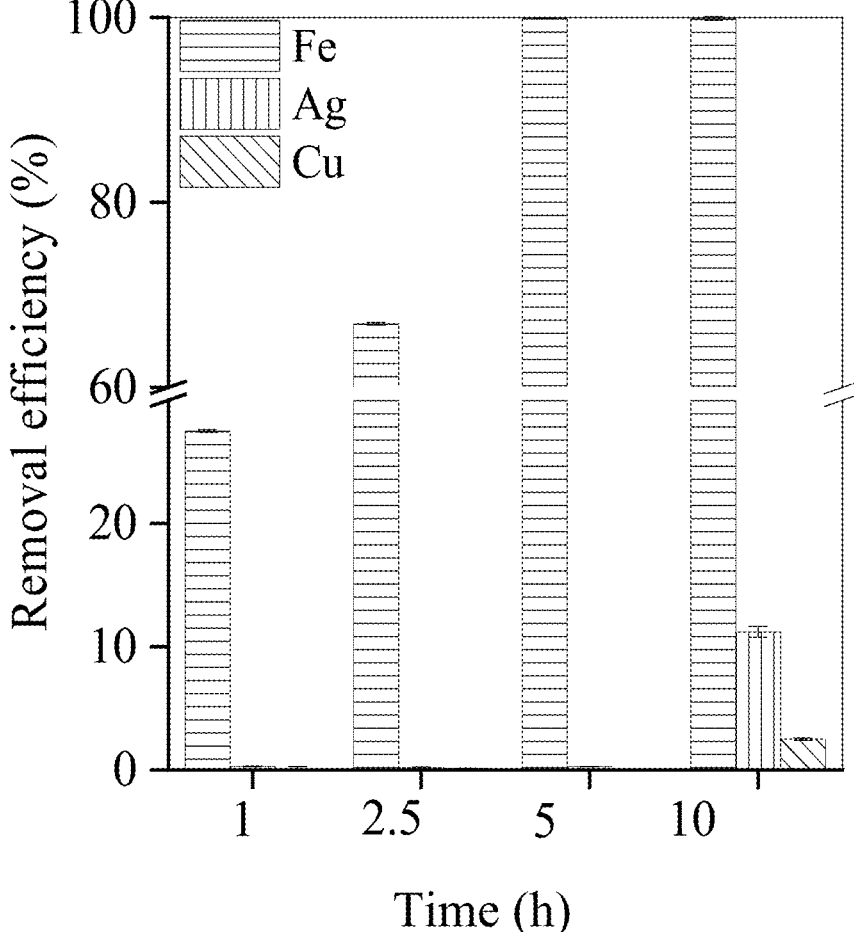
FIG. 12 shows the effect of different hydrothermal reaction times on removal of metals in 3) of Example 5.
Figure 13:
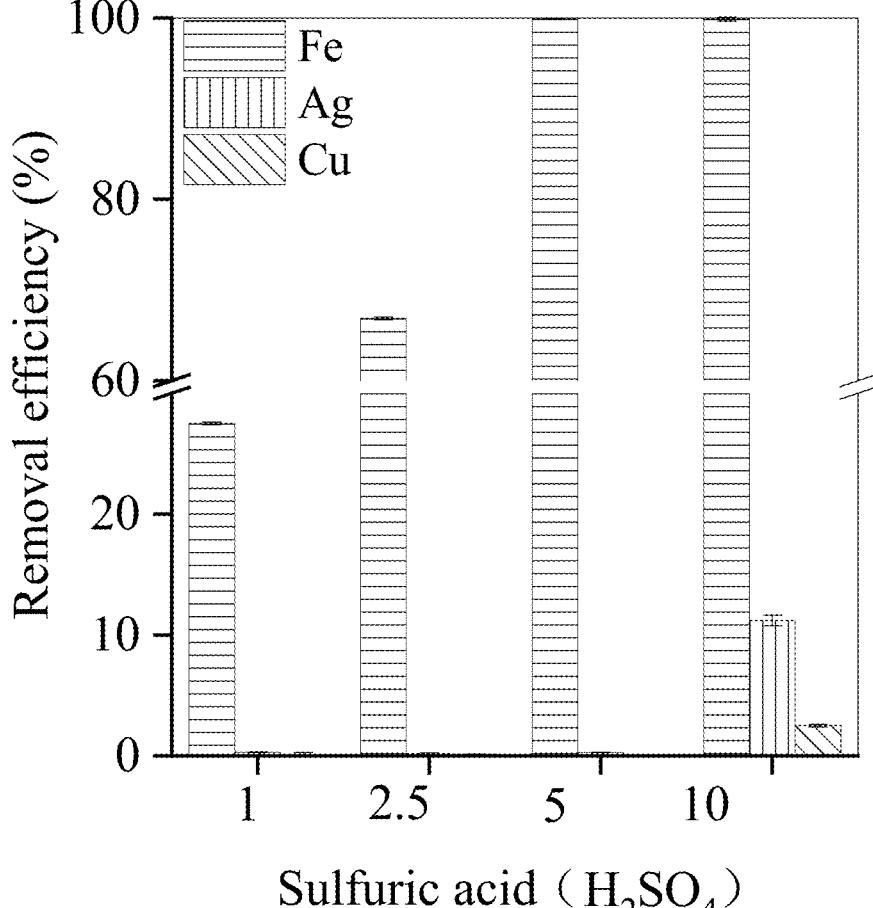
FIG. 13 shows the effect of sulfuric acid leaching method on the removal of metals in 3) of Comparison Example 1.

Experimental results indicate when the mass concentration ratio of soluble starch to Fe in the solution is 6.5 in 3), almost all iron can be removed without precipitation of silver and copper, as shown in the FIG. 10.

The best removal effect is achieved at a mass concentration ratio of 6.5. However, excessive amount of soluble starch leads to Ag co-precipitation under the same reaction conditions, which affects the purity of metal recycling and the retention rate of Ag.

Example 4

A fourth example is similar to Example 1, with the following differences:

In 3), soluble starch was added and the mixture was reacted for 300 min at 90° ° C., 125° C., 150° C., and 180° C., respectively.

Experimental results indicate that the most suitable temperature is 150° C. If the temperature is too high or too low, the optimal removal effect of Fe and high retention rate of Ag cannot be achieved.

Example 5

A fifth example is similar to Example 1, with the following differences:

In 3), soluble starch was added and the mixture was reacted at 150° ° C. for 60, 150, 300, and 600 min, respectively.

Experimental results indicate that the precipitation rate of metals varies with different reaction times. The removal rate of Fe is low in a short period of time. However, if the reaction time is too long, it may result in co-precipitation of Ag.

Comparison Example 1

A sixth example is similar to Example 1, with the following differences:

In 2), the metal was leached from the computer chips using 3 mol/L hydrochloric acid or sulfuric acid.

However, the experimental results indicate that the use of hydrochloric acid or sulfuric acid reduces the efficiency of metal leaching. For instance, Ag reacts with hydrochloric acid, and sulfuric acid hinders the separation of Fe under the same reaction conditions.

It will be obvious to those skilled in the art that changes and modifications may be made, and therefore, the aim in the appended claims is to cover all such changes and modifications.

8

What is claimed is:

1. A method, comprising:
1) heating to disassemble an IC chip, and crushing the IC chip into powders;
2) adding the powders to a nitric acid solution to yield a first mixture, heating and centrifuging the first mixture, and collecting a first filtrate comprising iron (Fe);
3) adding soluble starch to the first filtrate obtained in 2) to yield a second mixture, wherein a mass concentration ratio of the soluble starch to Fe in the first filtrate is 5.20-7.30; heating the second mixture to 130-175° C. for a first hydrothermal reaction, separating a first precipitate from the first hydrothermal reaction and collecting a second filtrate;
4) heating the second filtrate to 160-230° C. for a second hydrothermal reaction, separating a second precipitate from the second hydrothermal reaction and collecting a third filtrate; drying, grinding, and sieving the second precipitate to obtain silver powders; and
5) adding alkali to the third filtrate to form a third precipitate of Cu, and separating the third precipitate to yield cupric hydroxide.

2. The method of claim 1, wherein the second hydrothermal reaction in 4) is conducted at a higher temperature than the first hydrothermal reaction in 3), with a temperature difference of at least 20° C.

3. The method of claim 2, wherein in 3), the mass concentration ratio of the soluble starch to Fe in the first filtrate is 6.0-7.0.

4. The method of claim 2, wherein in 3), the first hydrothermal reaction is performed at 140-160° C.

5. The method of claim 4, wherein in 4), the second hydrothermal reaction is performed at 160-190° C.

6. The method of claim 1, wherein in 3), the first hydrothermal reaction is performed for 320-400 min.

7. The method of claim 1, wherein in 3), before conducting the first hydrothermal reaction, the pH of the first filtrate is adjusted to 0.3±0.02.

8. The method of claim 1, wherein in 4), the second hydrothermal reaction is performed for 560-640 min.

9. The method of claim 1, wherein in 4), the solid is dried at 60-100° C.

10. The method of claim 1, wherein in 2), a heating temperature for the first mixture of the powders and the nitric acid solution is 50-90° C.

11. The method of claim 1, wherein in 5), the alkali is added to adjust the pH of the first filtrate to 8.2±0.05.

12. The method of claim 1, comprising:
1) comprises: heating an adhesive that connects a heat sink and the IC chip with a heat gun at 200-240° C. for 30 seconds, and detaching the heat sink from the IC chip to obtain a detached IC chip; crushing the detached IC chip into coarse particles of a diameter of 2.5-1 cm using a coarse crusher; and further crushing the coarse particles into the powders of a diameter of 0.3 cm using a fine crusher;
2) comprises: pouring the powders obtained in 1) into a glass beaker; adding 3 mol/L nitric acid solution to the powders in a solid-liquid ratio of 1:3 to yield the first mixture; heating and stirring the first mixture in the glass beaker at 50-90° C. with a stirring rate of 300 r/min for 1-2 h; centrifuging the first mixture and passing the first mixture through a filter to yield the first filtrate, so that a filter residue is separated from the first filtrate; the first filtrate further comprises silver and other metals, and the filter residue comprises alloy;

3) comprises: measuring the pH of the first filtrate obtained in 2); adding nitric acid to adjust the pH of the first filtrate to 0.3=0.02 thus yielding a mixed solution; measuring a content of Fe in the mixed solution; pouring the mixed solution into a first reaction kettle and adding the soluble starch to the mixed solution to yield the second mixture, wherein the mass concentration ratio of the soluble starch to Fe in the solution is 5.20-7.30; stirring the second mixture; covering the first reaction kettle and heating the first reaction kettle to 130-175° C. for 300 min to carry out the first hydrothermal reaction, to yield the first precipitate at a bottom of the first reaction kettle; centrifuging a first resulting product in the first reaction kettle, so that the first precipitate is separated from the second filtrate; collecting the second filtrate; and drying the first precipitate at 75° C. for 20 h, wherein the first precipitate is a byproduct of hematite;

4) comprises: transferring the second filtrate obtained in 3) into a second reaction kettle; sealing the second reaction kettle at 160-230° C. for 600 min for the second hydrothermal reaction; after the second hydrothermal reaction, cooling a second resulting product in the second reaction kettle to room temperature and centrifuging the second resulting product to yield the second precipitate and the third filtrate; collecting and drying the second precipitate at 60-100° C., then grinding and sieving the dried second precipitate to obtain silver powders; and 5) comprises: adding 7 mol/L NaOH to the third filtrate to adjust the pH of the third filtrate to 8.2±0.05; resting a third mixture of the third filtrate and NaOH at 30° C. for 5 h; centrifuging the third mixture for solid-liquid phase separation to yield the third precipitate; collecting the third precipitate; and drying the third precipitate at 80° C.

* * * * *